(12) United States Patent
Kinoshita et al.

(10) Patent No.: US 7,315,412 B2
(45) Date of Patent: Jan. 1, 2008

(54) FOCUS STABILIZING MECHANISM FOR MICROSCOPES AND SIMILAR OPTICAL INSTRUMENTS

(75) Inventors: Kazuhiko Kinoshita, Aichi (JP); Megumi Shio, Kanagawa (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 10/484,626

(22) PCT Filed: Jun. 13, 2002

(86) PCT No.: PCT/JP02/05922

§ 371 (c)(1),
(2), (4) Date: Jan. 23, 2004

(87) PCT Pub. No.: WO03/012520

PCT Pub. Date: Feb. 13, 2003

(65) Prior Publication Data

US 2004/0174589 A1   Sep. 9, 2004

(30) Foreign Application Priority Data

Jul. 26, 2001   (JP) .............................. 2001-225306

(51) Int. Cl.
*G02B 21/00*   (2006.01)
*G02B 21/06*   (2006.01)

(52) U.S. Cl. ..................... 359/368; 359/383; 359/392

(58) Field of Classification Search ........ 359/368–398, 359/800–822

See application file for complete search history.

(56) References Cited

U.S. PATENT DOCUMENTS

| 4,703,181 | A | * | 10/1987 | Swann et al. .......... 250/442.11 |
| 5,317,153 | A | * | 5/1994 | Matsushiro et al. ........ 250/306 |
| 5,703,715 | A | * | 12/1997 | Gaul .......................... 359/392 |
| 5,978,086 | A | * | 11/1999 | Aziz et al. .................. 356/511 |
| 6,628,459 | B2 | * | 9/2003 | Ue ............................. 359/392 |
| 6,678,089 | B1 | * | 1/2004 | Engelhardt et al. ......... 359/368 |

FOREIGN PATENT DOCUMENTS

| EP | 762175 A2 | 3/1997 |
| JP | 3058011 | 3/1991 |
| JP | 10-90610 A1 | 4/1998 |
| JP | 2001-305432 A1 | 10/2001 |
| JP | 2002-328309 A1 | 11/2002 |
| JP | 2003-029162 A1 | 1/2003 |

* cited by examiner

*Primary Examiner*—Thong Q Nguyen
(74) *Attorney, Agent, or Firm*—Rader, Fishman & Grauer, PLLC

(57) ABSTRACT

An optical microscope of high stability such that problems wherein an image of a sample becomes unsharp during observation and movement (drift) of the object point (object) occurs are solved because the defocusing in the Z direction attributable to thermal expansion of the optical microscope is compensated. The optical instruments are characterized as comprising an optical system unit symmetrical to the optical axis in terms of weight and shape and a peripheral unit having a sample positioning mechanism is constituted by combining components having temperature dependences close to zero.

9 Claims, 4 Drawing Sheets

FOCUS STABILIZING MECHANISM FOR MICROSCOPES AND SIMILAR OPTICAL INSTRUMENTS

FIELD OF THE INVENTION

This invention relates to a focus stabilizing mechanism for optical equipment, optical measuring instruments, and optical microscopes. On optical microscopes and similar instruments, in particular, the image of the viewed sample becomes out of focus and the object point (object) moves (drifts) due to the minute displacement of the microscope caused by fluctuations in the ambient temperature. This invention relates to a focus stabilizing mechanism for microscope and similar instruments that allows samples to be observed stably without the effects of the above-mentioned out-of-focus image or movement of the object due to drift.

BACKGROUND OF THE INVENTION

Microscopes are generally equipped with an objective lens revolver (revolver) that houses two or more different objective lenses. The desired objective lens is turned into the optical path of the microscope by rotating the revolver. The objective lenses are focused by moving the stage along the optical path of the objective lens of the microscope. As is well known, the body of the microscope expands due to rises in ambient temperature, changing the distance between the stage including the prepared specimen being viewed and the objective lens beyond the depth of focus (in microns). This causes undesirable results such as the loss of the focused position (state) that was adjusted at ordinary temperature.

In conventional optical measuring instruments and optical microscopes, the objective lens (the key component of such optical equipment) has a temperature dependency of about one 1 µm per ° C., the hardware supporting the objective lens is asymmetrical to the optical axis, and is temperature dependent. Furthermore, the stage and sample positioning mechanism are unbalanced because it is extremely asymmetrical to the optical axis in weight and shape, causing the focus to be unstable against temperature fluctuations and also causing the object point to drift.

A temperature fluctuation of 0.1° C. is unavoidable even when the room temperature is controlled. When the temperature dependency of the object lens is 1.0 µm per 1° C. , a drift of 100 nm will result per each temperature fluctuation of 0.1° C., causing unstable focusing.

Due to the above out-of-focus conditions, conventional optical microscopes cannot meet the precision requirements for measuring the position of molecules or molecular motion. This invention aims to realize an optical microscope of high stability in which the image of the sample does not become out of focus during observation, and movement (drift) of the object point (object) does not occur.

This invention intends to improve the focusing stability of the microscope by directly fixing the objective lens, the sample-positioning stage, and the focusing mechanism symmetrical in weight and shape to the center of the optical axis, and by manufacturing and assembling the above configuration with components that have the lowest temperature dependencies, or by configuring the components so that the sum of the temperature dependencies of the individual components is equivalent and the total length of balance of the above units is equal. Focusing stability provided by this invention refers to the stability of the relative positions of the focusing position of the object lens and the object point on the X, Y, and Z axes independently of environmental conditions.

Components with an extremely small temperature dependency include the stage unit made of Invar (steel of specific components of iron, carbon, and chrome), with the objective lens of the microscope made of glass and metal that have an extremely small temperature dependency. Optical equipment manufactured from the above materials would be very expensive. To reduce the manufacturing cost, the temperature dependencies are eliminated using special compensating mechanisms.

SUMMARY OF THE INVENTION

The technological methods this invention uses to achieve the above objectives are:

A focus-stabilizing mechanism for microscopes and similar instruments, with the mechanism comprising an optical system unit and a peripheral unit that has a sample-positioning mechanism, which are symmetrical to the optical axis in weight and shape. The focus-stabilizing mechanism is characterized by the sum of the temperature dependencies of each mechanism being close to zero.

The invention also relates to a focus-stabilizing mechanism for microscopes and similar instruments, with the mechanism configured by combining components that have temperature dependencies close to zero. The microscope comprises an optical system with the objective lens mounted at the center of the top of a base using a hollow Z-axis stage or a hollow cylinder, which is symmetrical to the optical axis in weight and shape, and a sample-positioning hollow drive stage, which is symmetrical to the optical axis in weight and shape, mounted on the fixed base.

Furthermore, the invention relates to the focus-stabilizing mechanism for microscopes and similar instruments comprising an optical system unit and a peripheral unit that has a sample-positioning mechanism, which is symmetrical to the optical axis in weight and shape. The focus-stabilizing mechanism is characterized by the sum of the temperature dependencies of each mechanism being equivalent.

The invention also relates to a focus-stabilizing mechanism for microscopes and similar instruments, with the mechanism configured so that the sum of the temperature dependencies of the optical system and of the stage is equivalent. The microscope comprises an optical system with the objective lens fixed to the center of the top of a base using a hollow Z-axis stage or a hollow cylinder, which is symmetrical to the optical axis in weight and shape, and a sample-positioning hollow drive stage, which is symmetrical to the optical axis in weight and shape mounted on the fixed base. Also, the invention also relates to a focus-stabilizing mechanism for microscopes and similar instruments, that uses Invar with a linear expansion coefficient of $3 \times 10^{-6}$ or less for the optical system unit or sample-positioning unit so that the physical heights of both components are aligned and the sum of their temperature dependencies is equivalent.

DETAILED DESCRIPTION OF THE PREFERRED EMBODIMENTS

Figure 1:
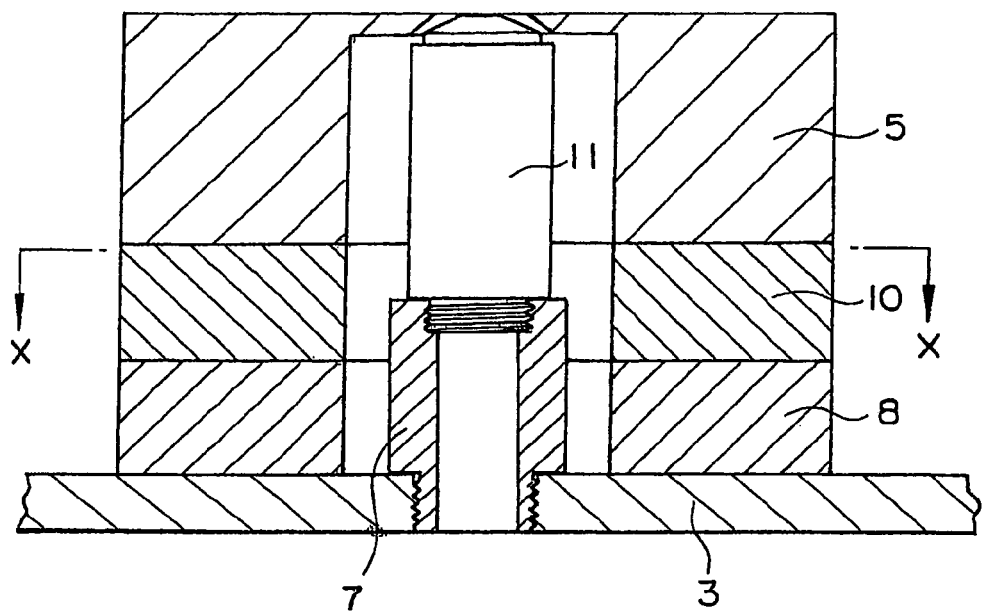
FIG. 1 is a side sectional view of a stabilizing mechanism of the microscope with a small temperature dependency.
Figure 2:
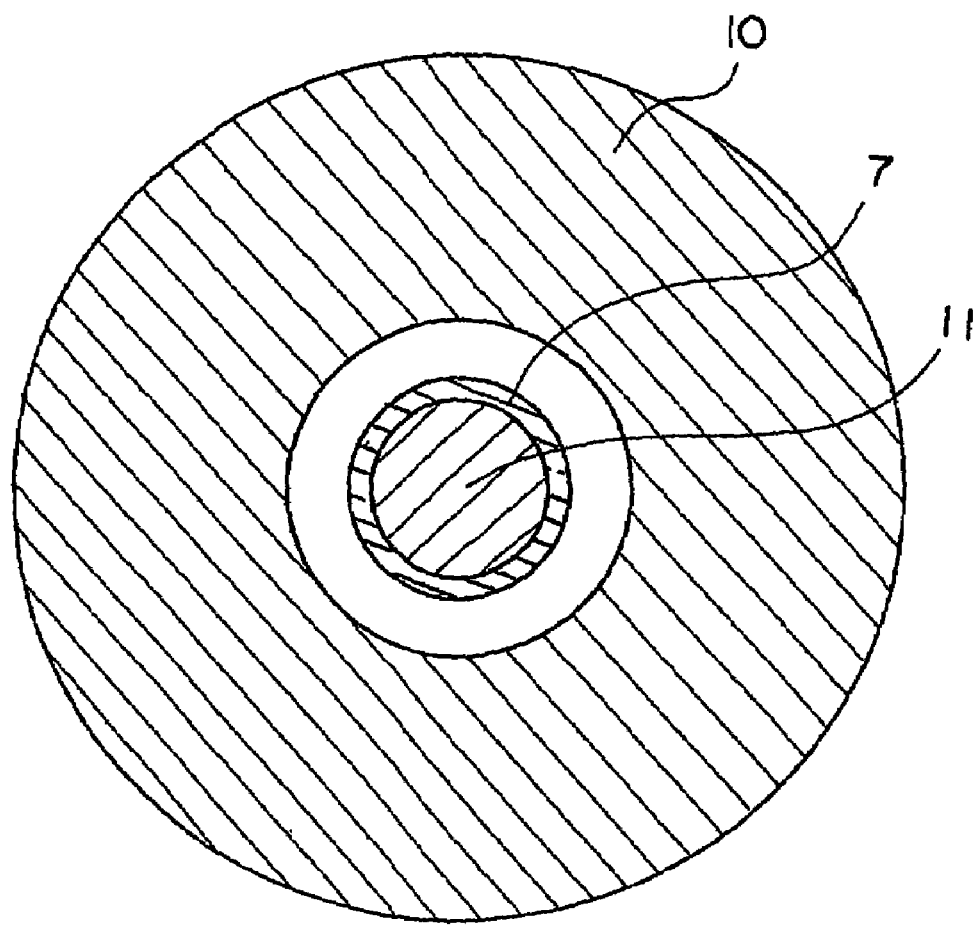
FIG. 2 is the X-X sectional view of that shown in FIG. 1.

The embodiments of this invention are described below with reference to the drawings. FIG. 1 is a side sectional view of the stabilizing mechanism of the microscope with small temperature dependencies close to zero. FIG. 2 is the X-X sectional view of that shown in FIG. 1.

In FIGS. 1 and 2, (3) is the base of the microscope on which the compensating cylinder (7) is mounted and fastened with screws or by other means. The objective lens (11) is mounted on the compensating cylinder (7) and fastened with screws or by other means. The object lens (11) and compensating cylinder (7) comprise the optical system unit.

The X-axis and Y-axis drive stages (8, 10) are mounted around the objectives lens (11) and compensating cylinder (7). The Z-axis fine-adjustment stage (5) is mounted on the X-axis and Y-axis drive stages (8, 10). The three stages (8, 10, 5) comprise the peripheral unit.

In the microscope of the above construction, all of the components, such as the object lens, the sample-positioning stage, and the core component of the focusing mechanism, are mounted directly on the center of the optical axis with symmetrical weight and shape. All the components are made of materials of extremely small temperature dependency. The component with an extremely small temperature dependency is the stage unit made of Invar (steel of specific components of iron, carbon, and chrome), and the objective lens of the microscope is made of glass with an extremely small temperature dependency and held by a metal barrel. Some types of Invar have a linear expansion coefficient of $3 \times 10^{-6}$ or less, making negligible any effects of temperature fluctuations up to $10°$ C.

By configuring the components as described above, the temperature dependency of all the components of the microscope can be eliminated, so that constantly definite microscopic measurements can be made. The focus stabilizing mechanism of this invention intends to stabilize the relative positions of the focal position of the objectives lens and the object point in all of the X, Y, and Z axes without being affected by environmental conditions, so that the sample can be observed stably.

A microscope with all of its components made from optimal materials, e.g., Invar with its very small temperature dependency, would be very expensive and impractical to manufacture. To solve this problem, we have realized a microscope, which has the same construction as shown in FIG. 1, that is configured so that the sum of temperature dependency of the components of the optical system unit and peripheral unit is constant and also the balance length of the components is equal. Specifically, for a microscope on which the focal point of the object lens moves toward the base of the objective lens due to temperature rises during measurement, the compensating cylinder comprising the optical system unit is made from materials with large positive temperature dependency and the compensating cylinder is designed to a length that compensates the thermal shrinkage of the objectives lens (that is, the drift of the focus due to temperature rises). The peripheral unit is made of materials such as Invar that have extremely small temperature dependency.

For a microscope on which the focal point of the objective lens moves away from the base of the objective lens due to temperature rises during measurement, the stage comprising the peripheral unit is made from materials that have a large positive temperature dependency, and the stage is designed to a height that compensates the thermal extension (that is, the drift of the focus). The compensating cylinder comprising the optical system unit is made of materials that have an extremely small temperature dependency.

Figure 3:
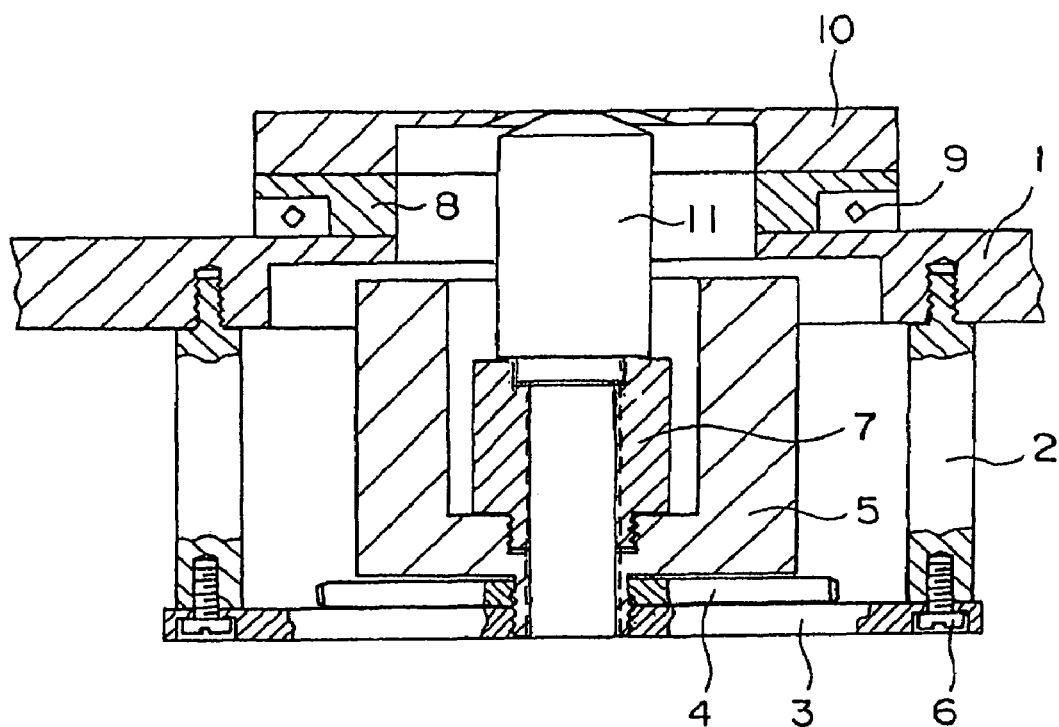
FIG. 3 is a side sectional view of the microscope with an optical compensating means to eliminate lens focusing drift.

The stability of the microscope can be improved by using materials with a very high temperature dependency for one unit, either the optical system unit or peripheral unit, and materials with a very low temperature dependency for the other unit to compensate the drift of the focal point of the objective lens, i.e., by designing the components of the microscope so that the sum of the temperature dependency of the components is constant and the balance length is equivalent. An example is given below of compensating, by means of the optical system, the drift of the focal point of the objective lens due to temperature fluctuation. FIG. 3 shows the side sectional view of the microscope, and FIG. 4 is the plan of the microscope.

Figure 4:
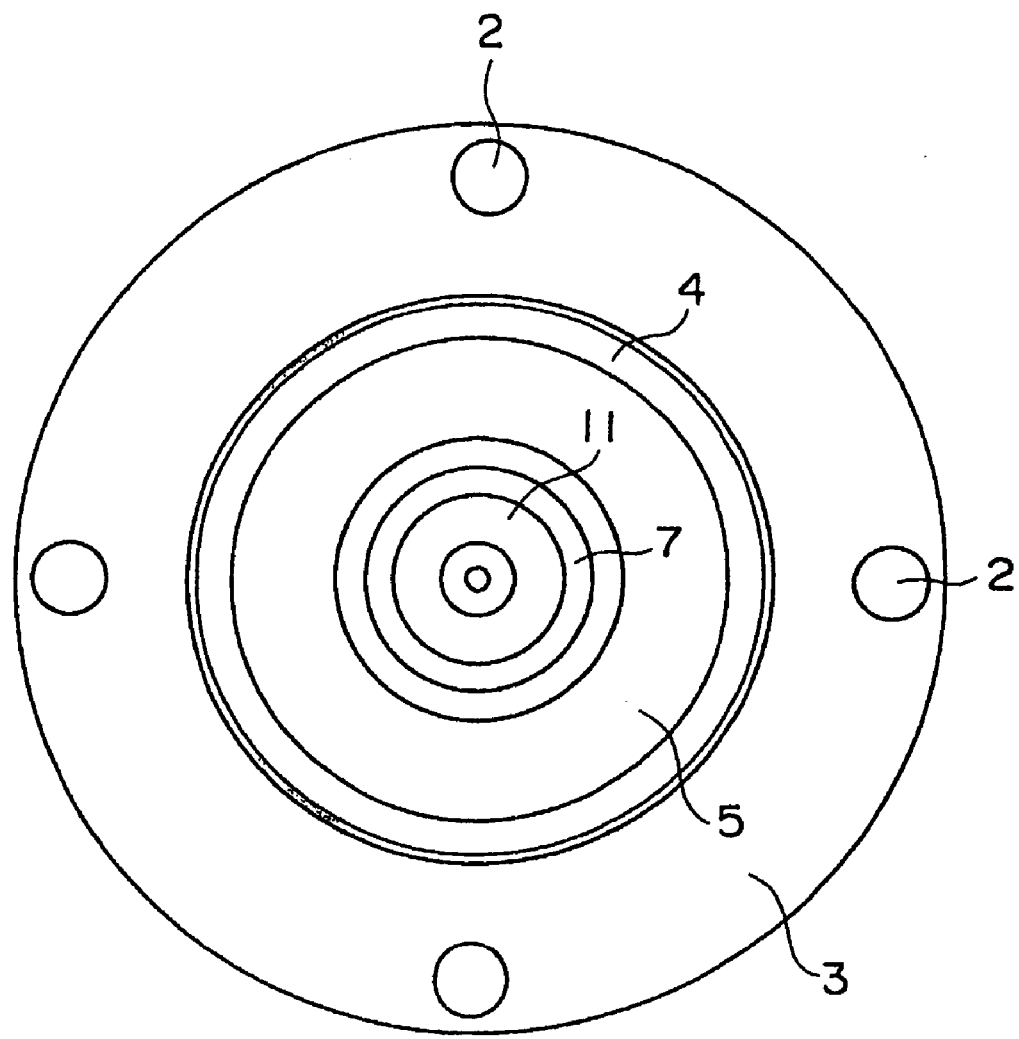
FIG. 4 is a plan view of the microscope shown in FIG. 3 excluding the stage-fixing plate and a portion above the stage-fixing plate.

As shown in FIGS. 3 and 4, the microscope comprises a stage mounting plate (1), compensating support (2), base (3), Z-axis fine-adjustment fastening ring (4), Z-axis fine-adjustment stage (5) (a hollow cylindrical piezoelectric element), set screw (6), compensating cylinder (7), Y-axis stage plate (8), straight-movement guide mechanism (9), X-axis stage plate (10), and object lens (11).

The Z-axis fine—adjustment stage (5) (a hollow cylindrical piezoelectric element) is screwed into the base (3), and is locked in a "lock-nut state" by means of the Z-axis fine—adjustment fastening ring (4). Compensating cylinder (7) is screwed into the Z-axis fine—adjustment stage (5). Objective lens (11) is mounted on compensating cylinder (7). The above components are hereafter called the "central block." The compensating support (2) is mounted vertically on base (3) fastened with set screws (6). Stage mounting plate (1) is fastened with screws through the compensating support (2). Y-axis stage plate (8) is mounted on the stage fastening plate (1). X-axis stage plate (10) is mounted on the Y-axis stage plate (8). The above components comprise the Y-axis drive stage and X-axis drive stage, which are called the "peripheral block."

The focal distance of the object lens varies and the focal plane (object point) drifts due to small fluctuations in room temperature even when an object is placed at the specified (designed) object point for the object lens on the microscope. However, if the following equation applies, stable microscopic measurements are possible such that out of focus images are avoided even when the temperature fluctuates.

$$\Delta P + \Delta X + \Delta O = \Delta H + \Delta C + \Delta S$$

where, $\Delta P$: Expansion/contraction of Z-axis fine-adjustment stage (piezoelectric stage)

$\Delta X$: Expansion/contraction of compensating cylinder $\Delta O$: Drift of focal point (object point) of objective lens $\Delta H$: Expansion/contraction of compensating support $\Delta C$: Expansion/contraction of stage-mounting plate $\Delta S$: Expansion/contraction of X- and Y-stage-mounting plate The drift of the focal point (object point) of the objective lens, obtained in measurements we have made to date, was a negative value (−).

Therefore, ΔX (Expansion/contraction of compensating cylinder)(7)=ΔH+ΔC+ΔS−(ΔP+ΔO)

The above values should be obtained by actual measurements, but some of them may be calculated as in the following example.

Expansion/contraction of Z-axis fine-adjustment stage (piezoelectric stage): ΔP=0.3 μm Drift of focal point (object point) of object lens: ΔO=−0.5 μm Expansion/contraction of compensating support: ΔH=0.06μm Expansion/contraction of stage-mounting plate: ΔC=0.15μm Expansion/contraction of X- and Y-stage-mounting plate: ΔS=0.20μm Expansion/contraction of compensating cylinder:

$$\begin{aligned}\Delta X &= \Delta H + \Delta C + \Delta S - (\Delta P + \Delta O)\\ &= 0.06 + 0.15 + 0.2 - (0.3 - 0.5)\\ &= 0.61\end{aligned}$$

Length of compensating cylinder=(Expansion/contraction ΔX of compensating cylinder)/(Linear expansion coefficient of the materials used)

When an aluminum-alloy compensating cylinder (7) is used, its linear expansion coefficient is $23\times10^{-6}$.

Then, the length of the compensating cylinder:
=$0.61/23\times10^{-6}$.
=26.5 mm Because the length of the compensating cylinder is calculated as above, the heights of the central block and the peripheral block must be aligned by adjusting the length of the compensating support (2).

The preferred embodiments of this invention are as described above. This invention is applicable not only to microscopes, but to a wide range of optical equipment including optical instruments and apparatus in which the focus becomes unstable when their components expand or contract due to temperature fluctuations. The designers are allowed to freely determine what components of the optical equipment are of small temperature dependency and what type of compensating method should be applied to such components. Furthermore, the stage is not limited to a square shape, and stages of various shapes can be used such as polygonal, circular, and ellipsoidal shapes.

In addition, this invention can be embodied in many forms without deviating from its purpose or principal features. The preferred embodiments described herein are therefore only examples in all respects and should not be construed to imply limitations.

Industrial Applicability

This invention realizes an optical microscope with extremely high stability and enables easy measurement of intermolecular distance and moment on the order of nanometers in molecular biology and molecular physics.

This invention can achieve excellent effects such as improving the focusing stability of the optical equipment (preventing the sample image from becoming out of focus and preventing the drift of the object point) by directly fixing the objective lens, the sample-positioning stage, and the core of the focusing mechanism with symmetrical weight and shape to the center of the optical axis, and by manufacturing and assembling the above with components that have the least temperature dependencies, or by configuring the components so that the sum of their temperature dependencies is constant and the balance length of the above units is equivalent.

What is claimed is:

1. A focus-stabilizing mechanism for a microscope, the focus-stabilizing mechanism comprising:
    an optical system unit comprising an objective lens and a compensating member, which are symmetrical to an optical axis in weight and shape, and
    a peripheral unit that has a sample-positioning stage, which is symmetrical to the optical axis in weight and shape,
    wherein the optical system unit and the peripheral unit are disposed on a base of the microscope, and
    wherein total temperature-dependency of the optical system unit and that of the peripheral unit are set so as to be approximately the same.

2. The focus-stabilizing mechanism for a microscope according to claim 1, wherein the total temperature dependency of the optical system unit and the peripheral unit are approximately zero.

3. The focus-stabilizing mechanism for a microscope according to claim 2, wherein the objective lens and the compensating member are provided to the base of the microscope through a hollow Z-axis stage of a hollow cylinder, which is symmetrical to the optical axis in weight and shape.

4. The focus-stabilizing mechanism for a microscope according to claim 3, wherein either the compensating member or the peripheral unit is made of material having a linear expansion coefficient of $3\times10^{-6}$ or less and the other one is made of material having positive temperature dependency.

5. A focus-stabilizing mechanism for a microscope comprising:
    an optical system unit comprising an objective lens and a compensating member, which are symmetrical to an optical axis in weight and shape,
    wherein the optical system unit and the peripheral unit having the sample-positioning stage are disposed on a base of the microscope,
    wherein total temperature-dependency of the optical system unit and that of the peripheral unit are set so as to be approximately the same, and
    wherein the objective lens and the compensating member are provided to the base of the microscope through a hollow Z-axis stage, which is symmetrical to the optical axis in weight and shape.

6. The focus-stabilizing mechanism for a microscope according to claim 5, wherein either the compensating member or the peripheral unit is made of Invar with a linear expansion coefficient of $3\times10^{-6}$ or less, and the other one is made of material having positive temperature dependency.

7. A focus-stabilizing mechanism for a microscope comprising:
    central block comprising an objective lens, a compensating cylinder, and a z-axis stage, which are symmetrical to an optical axis in weight and shape, a peripheral block that has a x-axis stage, a y-axis stage and at least one compensating cylinder, and a z-axis stage, which are symmetrical to the optical axis in weight and shape, a first base, and a second base, wherein the total temperature-dependency of the central block and that of the peripheral block are set so as to be approximately the same, and the at least one compensating support and the z-axis stage are attached to the second base, the objective lens is disposed, through the compensating cylinder, on the z-axis stage, and the at least one compensation support is disposed on the first base, and the x-axis stage and the y-axis stage are disposed on the first base.

8. The focus-stabilizing mechanism for a microscope according to claim 7, wherein either the compensating member or the peripheral block is made of material having a linear expansion coefficient of $3 \times 10^{-6}$ or less and the other one is made of material having positive temperature dependency.

9. A focus-stabilizing mechanism for a microscope in which a focal point of an objective lens moves away from a base of the objective lens due to temperature rise, comprising:

an optical system unit comprising the objective lens and a compensating member which is made from a first material having an approximately no temperature dependency, and a peripheral unit made from second material that has a positive temperature dependency so that change of the focal point is compensated, wherein the optical system unit and the peripheral unit are disposed on the base of the microscope, and wherein total temperature-dependency of the optical system unit and that of the peripheral unit are set so as to be approximately the same.

* * * * *